United States Patent Office 2,713,068
Patented July 12, 1955

2,713,068
ALKOXY SUBSTITUTED NAPHTHALENONES

Angelo J. Speziale, Kirkwood, Mo., assignor to Monsanto Chemical Company, St. Louis, Mo., a corporation of Delaware No Drawing. Application December 12, 1952,
Serial No. 325,703

17 Claims. (Cl. 260—586)

This invention relates to new and useful alkoxy substituted naphthalenones and to the method of making same. More particularly this invention relates to 2-alkoxy - 4-keto-4a-methyl-1,4,4a,5,8,8a-hexahydronaphthalenes, which alkoxy substituted naphthalenones may be represented by the structural formula

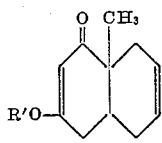

where R' is a short chain alkyl radical such as methyl, ethyl, propyl, isopropyl, butyl, amyl, etc.

The alkoxy substituted naphthalenones of this invention are useful as insecticides. The new compounds are also useful intermediates in the total synthesis of steroids.

It will be obvious to those skilled in the art that the new compounds of this invention contain two optically active carbon atoms. As a result thereof, these compounds may exist in four optically active isomeric forms or two racemates. All such forms of the new alkoxy substituted naphthalenones are contemplated as coming within the scope of this invention. The notations "cis" and "trans" as used in the specification indicate the special configuration of the CH₃ group and H at positions 4a and 8a respectively, in the structural formula. It is to be understood that where no notation appears with the name of the new compounds, that the name is to be interpreted in its generic sense, i. e., as representing the individual isomers in separated form as well as the racemic mixtures thereof or the total unresolved mixture of isomers.

The trans isomers of the new compounds of this invention are particularly useful in the preparation of "trans-bicyclic ketones," i. e., compounds of the structure

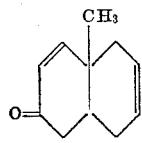

(Trans-2-keto-4a-methyl-1,2,4a,5,8,8a-hexahydronaphthalene)

which ketones are readily obtainable by reacting a trans-2-alkoxy - 4 - keto-4a-methyl-1,4,4a,5,8,8a-hexahydronaphthalene compound of this invention with lithium aluminum hydride (LiAlH₄) in an ether solvent therefor (or with aluminum isopropoxide in isopropanol) under anhydrous conditions and hydrolyzing the reaction mix so obtained with an inorganic acid such as dilute sulfuric acid. The preparation thereof may be represented by the following flow diagram

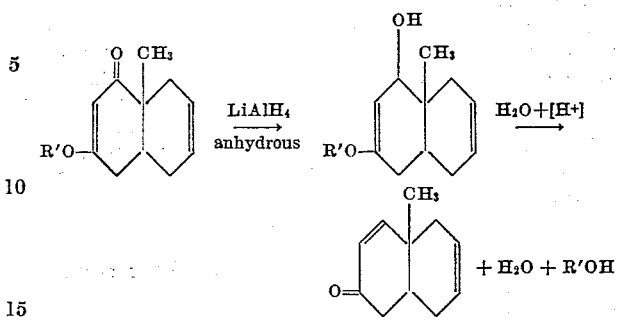

Such "trans-bicyclic ketones" are important intermediates in the total synthesis of steroids (J. A. C. S., vol. 74, p. 4223ff, September, 1952) having cortisone-like properties.

The new compounds are readily prepared by the reductive deacylation of a sulfonic acid ester of a 1-hydroxy - 4-keto-2-alkoxy-4a-methyl-hexahydronaphthalene of the structural formula

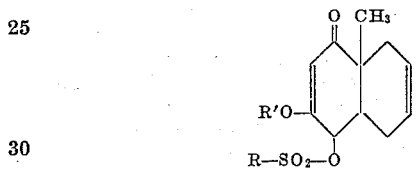

where R' has the same significance as aforedescribed, and where R is an organic radical, e. g. the carbocyclic radicals cycloalkyl, aryl, hydrogenated aryl, terpenyl, diterpenyl, and the like, and their alkyl and aryl substituted homologues, with zinc and acetic acid.

As illustrative of sulfonic acid esters useful in the preparation of the new compounds of this invention are the aryl (particularly the benzenoid hydrocarbon) sulfonic acid esters described and claimed in my co-pending application Serial No. 318,076, filed October 31, 1952, now Patent No. 2,689,256. A particularly preferred group of esters for the preparation of the new alkoxy substituted naphthalenones are the camphoryl sulfonic acid esters, particularly the camphoryl-10-sulfonic acid esters such as those derived from d-camphoryl-10-sulfonic acid described and claimed in co-pending application Serial No. 319,409, filed November 7, 1952, now Patent No. 2,689,257 of Q. E. Thompson. Other operable sulfonic acid esters are those wherein R is cyclobutyl, cyclopentyl, cyclohexyl, tetrahydronaphthyl, anthracyl, etc.

As illustrative of the new compounds and the preparation thereof is the following.

Example I

To a suitable reaction vessel is added and intimately mixed approximately 10.5 parts by weight (substantially 0.029 mole) of unresolved 1-(p-tosyloxy)-4-keto-2 - methoxy - 4a-methyl-1,4,4a,5,8,8a - hexahydronaphthalene and approximately 25 parts by weight of glacial acetic acid. Thereupon and with agitation approximately 10.5 parts by weight of zinc dust is slowly fed into the mixture while maintaining the temperature at about 30° C. Upon completion of the zinc addition the reaction mixture is agitated for about one hour, the temperature rising to about 60° C. and then dropping to about 30° C. over the interim. The reaction mix is then filtered and the filter cake washed with glacial acetic acid. The original filtrate and acetic acid washings are combined and poured into 200 parts by weight of cold water. A white solid precipitates which upon recovery and recrystallization from petroleum ether yielded white needle-like crystals of unresolved 4-keto-2-methoxy-4a-methyl-1,4,4a,5,8,8a-hexahydronaphthalene.

*Example II*

Employing the procedure of Example I but replacing 1-(p-tosyloxy)-4-keto-2-methoxy-4a-methyl-1,4,4a,5,8,8a-hexahydronaphthalene with an equimolecular amount of dl-trans - 1 - (p-xylene-2-sulfonyloxy)-4-keto-2-ethoxy-4a-methyl-1,4,4a-5,8,8a-hexahydronaphthalene and employing 75% aqueous acetic acid instead of glacial acetic acid yielded a light yellow oil identified as dl-trans-4-keto - 2 - ethoxy-4a-methyl-1,4,4a,5,8a-hexahydronaphthalene.

*Example III*

Employing the procedure of Example I but replacing 1 - (p - tosyloxy)-4-keto-2-methoxy-4a-methyl-1,4,4a,5,8,-8a-hexahydronaphthalene with an equimolecular amount of unresolved l-mesitylene sulfonyloxy-4-keto-2-n-propoxy - 4a - methyl-1,4,4a,5,8,8a-hexahydronaphthalene, a good yield of unresolved 4-keto-2-n-propoxy-4a-methyl-1,4,4a,5,8,8a-hexahydronaphthalene is obtained.

*Example IV*

To a suitable reaction vessel is added and intimately mixed approximately 10.5 parts by weight (substantially 0.025 mole) of dl-trans-1-(d-camphor-10-sulfonyloxy)-4 - keto - 2 - methoxy-4a-methyl-1,4,4a,5,8,8a-hexahydronaphthalene and approximately 25 parts by weight of glacial acetic acid. Thereupon and with agitation approximately 10.5 parts by weight of zinc dust is slowly fed into the mixture while maintaining the reaction temperature at about 30° C. Upon completion of the zinc addition the reaction mixture is agitated for about one hour, the temperature rising to about 60° C. and then dropping to about 30° C. over the interim. The reaction mix is then filtered and the filter cake washed with glacial acetic acid. The original filtrate and acetic acid washings are combined and poured into 200 parts by weight of cold water. A white solid precipitates which upon recovery and recrystallization from petroleum ether yielded white needle-like crystals of dl-trans-4-keto-2-methoxy - 4a-methyl-1,4,4a,5,8,8a-hexahydronaphthalene, melting point 76–77° C.

*Example V*

Employing the procedure of Example IV but replacing dl - trans - 1 - (d-camphor-10-sulfonyloxy)-4-keto-2-methoxy - 4a-methyl-1,4,4a,5,8,8a-hexahydronaphthalene with an equimolecular amount of dl-trans(d-camphor-10 - sulfonyloxy) - 4-keto-2-n-butoxy-4a-methyl-1,4,4a,5,-8,8a-hexahydronaphthalene, a good yield of dl-trans-4-keto - 2 - n - butoxy - 4a-methyl-1,4,4a,5,8,8a-hexahydronaphthalene is obtained.

*Example VI*

Employing the procedure of Example IV but replacing dl - trans - 1-(d - camphor - 10 - sulfonxyloxy) - 4-keto-2-methoxy - 4a-methyl-1,4,4a,5,8,8a-hexahydronaphthalene with an equimolecular amount of dl-cis-1-p-cumene sulfonyloxy - 4 - keto - 2 - methoxy-4a-methyl-1,4,4a,5,8,8a-hexahydronaphthalene, a good yield of dl-cis-4-keto-2-methoxy - 4a-methyl-1,4,4a,5,8,8a-hexahydronaphthalene is obtained.

*Example VII*

To a suitable reaction vessel is added and intimately mixed approximately 10.5 parts by weight (substantially 0.025 mole) of l-trans-1-(d-camphor-10-sulfonyloxy)-4-keto - 2 - methoxy - 4a - methyl-1,4,4a,5,8,8a-hexahydronaphthalene and approximately 25 parts by weight of glacial acetic acid. Thereupon and with agitation approximately 10.5 parts by weight of zinc dust is slowly fed into the mixture while maintaining the temperature at about 30° C. Upon completion of the zinc addition the reaction mixture is agitated for about one hour, the temperature rising to about 60° C. and then dropping to about 30° C. over the interim. The reaction mix is then filtered and the filter cake washed with glacial acetic acid. The original filtrate and acetic acid washings are combined and poured into 200 parts by weight of cold water. A white solid precipitates which upon recovery and recrystallization from petroleum ether yielded white needle-like crystals of l-trans-4-keto-2-methoxy-4a-methyl - 1,4,4a,5,8,8a - hexahydronaphthalene, melting point 94–95° C.

*Example VIII*

Employing the procedure of Example VII but replacing l - trans - 1 - (d-camphor-10-sulfonyloxy)-4-keto-2-methoxy-4a-methyl-1,4,4a,5,8,8a - hexahydronaphthalene with an equimolecular amount of l-trans-1-(cymene-3-sulfonyloxy) - 4 - keto-2-pentoxy-4a-methyl-1,4,4a,5,8,8a-hexahydronaphthalene, a good yield of l-trans-4-keto-2-pentoxy - 4a - methyl - 1,4,4a,5,8,8a-hexahydronaphthalene is obtained.

*Example IX*

To a suitable reaction vessel is added and intimately mixed approximately 10.5 parts by weight (substantially 0.025 mole) of d-trans-1-(d-camphor-10-sulfonyloxy)-4-keto - 2 - methoxy - 4a - methyl-1,4,4a,5,8,8a-hexahydronaphthalene and approximately 25 parts by weight of glacial acetic acid. Thereupon and with agitation approximately 10.5 parts by weight of zinc dust is slowly fed into the mixture while maintaining the temperature at about 30° C. Upon completion of the zinc addition the reaction mixture is agitated for about one hour, the temperature rising to about 60° C. and then dropping to about 30° C. over the interim. The reaction mix is then filtered and the filter cake washed with glacial acetic acid. The original filtrate and acetic acid washings are combined and poured into 200 parts by weight of cold water. A white solid precipitates which upon recovery and recrystallization from petroleum ether yielded white needle-like crystals of d-trans-4-keto-2-methoxy - 4a-methyl-1,4,4a,5,8,8a-hexahydronaphthalene, melting point 94–95° C.

Although the preceding examples have illustrated specific embodiments in the preparation of the new compounds of this invention, it is to be understood that substantial variations may be made in the reactants and reactant conditions without departing from the spirit or scope of this invention. For example, the reaction temperature may be varied over a substantial range, but preferably the reaction temperature is maintained in the range of 20° to 75° C.

While glacial (100%) acetic acid is particularly preferred, aqueous acetic acid may be employed. However, it is preferable that the aqueous acetic acid used contain not less than 75% acetic acid by weight. The quantity of acetic acid employed may also be varied over a wide range, the amount being governed principally by that amount which is necessary to provide a fluid medium. While it is preferred that the sulfonic acid ester reactant be dissolved in the reaction medium, such is not absolutely necessary as it is sufficient if enough acetic acid is present to provide a mixture which is fluid at the reaction temperature and capable of proper agitation.

The quantity of zinc used in the process for the preparation of the new compounds of this invention is also subject to substantial variation. Generally a considerable excess of zinc is employed inasmuch as the excess is recovered from the reaction mixture. From about 2 to about 20 equivalents of zinc for each equivalent weight of the sulfonic acid ester can be employed. Granular zinc or zinc dust can be used in the novel process, although zinc dust is preferred.

Although the preceding examples have described certain embodiments of this invention both as to the nature of the novel alkoxy substituted naphthalenones and their method of preparation, it is to be understood that substantial variations obvious to those skilled in the art in the reactants and reaction conditions may be made without departing from the spirit or scope of this invention.

What is claimed is:
1. As a new compound a 2-alkoxy-4-keto-4a-methyl-1,4,4a,5,8,8a-hexahydronaphthalene of the formula

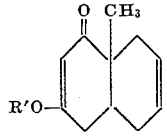

where R' is a short chain alkyl radical.

2. The compound of claim 1 wherein R' is an alkyl radical containing 1 to 5 carbon atoms.
3. The trans isomers of the compound of claim 2.
4. As a new compound 2-methoxy-4-keto-4a-methyl-1,4,4a,5,8,8a-hexahydronaphthalene.
5. As a new compound dl-trans-2-methoxy-4-keto-4a-methyl-1,4,4a,5,8,8a-hexahydronaphthalene.
6. As a new compound d-trans-2-methoxy-4-keto-4a-methyl-1,4,4a,5,8,8a-hexahydronaphthalene.
7. As a new compound l-trans-2-methoxy-4-keto-4a-methyl-1,4,4a,5,8,8a-hexahydronaphthalene.
8. In the process of making the compounds of claim 1 the step which comprises reacting a sulfonic acid ester of a 1-hydroxy-2-alkoxy-4-keto-4a-methyl-1,4,4a,5,8,8a-hexahydronaphthalene of the formula

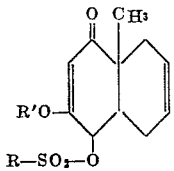

where R is a carbocyclic radical and where R' is a short chain alkyl radical with zinc and acetic acid.

9. The process of claim 8 wherein the acetic acid content of the acetic acid employed is in the range of about 75% to 100%.

10. In the process of making the compound of claim 4 the step which comprises reacting a benzenoid hydrocarbon sulfonic acid ester of 1-hydroxy-2-methoxy-4-keto-4a-methyl-1,4,4a,5,8,8a-hexahydronaphthalene with zinc and acetic acid.

11. In the process of making the compound of claim 4 the step which comprises reacting a camphoryl sulfonic acid ester of 1-hydroxy-2-methoxy-4-keto-4a-methyl-1,4,-4a,5,8,8a-hexahydronaphthalene with zinc and acetic acid in an anhydrous medium.

12. In the process of making the compound of claim 4 the step which comprises reacting a camphoryl-10-sulfonic acid ester of 1-hydroxy-2-methoxy-4-keto-4a-methyl-1,4,4a,5,8,8a-hexahydronaphthalene with zinc and acetic acid in an anhydrous medium.

13. In the process of making the compound of claim 5 the step which comprises reacting the d-camphoryl-10-sulfonic acid ester of dl-trans-1-hydroxy-2-methoxy-4-keto-4a-methyl-1,4,4a,5,8,8a-hexahydronaphthalene with zinc and acetic acid in an anhydrous medium.

14. In the process of making the compound of claim 6 the step which comprises reacting the d-camphoryl-10-sulfonic acid ester of d-trans-1-hydroxy-2-methoxy-4-keto-4a-methyl-1,4,4a,5,8,8a-hexahydronaphthalene with zinc and acetic acid in an anhydrous medium.

15. In the process of making the compound of claim 7 the step which comprises reacting the d-camphoryl-10-sulfonic acid ester of l-trans-1-hydroxy-2-methoxy-4-keto-4a-methyl-1,4,4a,5,8,8a-hexahydronaphthalene with zinc and acetic acid in an anhydrous medium.

16. As a new compound 2-ethoxy-4-keto-4a-methyl-1,4,4a,5,8,8a-hexahydronaphthalene.

17. As a new compound dl-trans-2-ethoxy-4-keto-4a-methyl-1,4,4a,5,8,8a-hexahydronaphthalene.

References Cited in the file of this patent
UNITED STATES PATENTS
1,903,862    Grossman _____ Apr. 18, 1933

OTHER REFERENCES
Woodward et al., J. A. C. S., vol. 74, No. 17, pp. 4223 to 4225 (Sept. 6, 1952).